US006050582A

United States Patent [19]

Horacek

[11] Patent Number: 6,050,582

[45] Date of Patent: Apr. 18, 2000

[54] CROSS-STRUT ARRANGEMENT FOR A FOLDING ROLLER-MOUNTED CHAIR

[75] Inventor: Gregor Horacek, Ransbach-Baumbach, Germany

[73] Assignee: Otto Bock Orthopaedische Industrie Besitz-und Verwaltungs-Kommanditgesellschaft, Duderstadt, Germany

[21] Appl. No.: 09/160,806

[22] Filed: Sep. 25, 1998

[30] Foreign Application Priority Data

Sep. 25, 1997 [DE] Germany ........................... 197 42 267

[51] Int. Cl.[7] ........................................................ B62M 1/14

[52] U.S. Cl. .................. 280/250.1; 280/42; 297/DIG. 4; 297/45

[58] Field of Search ................................ 297/DIG. 4, 42, 297/44, 45, 19, 452.4, 452.2, 344.12, 344.18, 338, 440.24, 350, 284.1; 248/421, 157, 188.5; 280/42, 649, 650, 656, 250.1, 647

[56] References Cited

U.S. PATENT DOCUMENTS

| | | | |
|---|---|---|---|
| 2,649,309 | 8/1953 | Deissner . | |
| 2,669,289 | 2/1954 | Usher et al. . | |
| 2,733,754 | 2/1956 | Leslie et al. . | |
| 3,117,760 | 1/1964 | Dresbach et al. . | |
| 4,082,348 | 4/1978 | Haury . | |
| 4,840,390 | 6/1989 | Lockard et al. . | |
| 4,989,890 | 2/1991 | Lockard et al. | 280/42 |
| 5,154,438 | 10/1992 | Barclay . | |

*Primary Examiner*—Milton Nelson, Jr.
*Attorney, Agent, or Firm*—Foley & Lardner

[57] ABSTRACT

Disclosed is a cross-strut arrangement for a folding roller-mounted chair having at least two struts connected to one another in a crosswise manner via a cross-strut articulation. The struts each are designed such that they can be changed in length, telescopically, for adjusting the seat width. At the top end of each strut a seat profile is located in the longitudinal direction of the folding roller-mounted chair and transverse to the strut for fixing the seat surface is adjustable to increase the seat depth. The cross-strut arrangement is comprised of the following features: each strut is made up of a top strut section and a bottom strut section, of which one telescopes in the other in a stepwise manner; each strut section has a row of holes corresponding to the other; a fastener which forms the cross-strut articulation is optionally fitted through a bore of one row of holes and, at the same time, through three further bores which are in alignment with said bore and belong to the other three rows of holes of the two struts; and the rows of holes are arranged such that the cross-strut articulation can always be fitted in the center of the crossover point.

18 Claims, 4 Drawing Sheets

CROSS-STRUT ARRANGEMENT FOR A FOLDING ROLLER-MOUNTED CHAIR

BACKGROUND OF THE INVENTION

1.) Field of the Invention

The invention relates to a cross-strut arrangement for a folding roller-mounted chair having at least two struts connected in a crosswise manner via a cross-strut articulation and designed such that they can be changed in length, telescopically, to adjust the seat width. At the top end of each strut a seat is mounted in the longitudinal direction of the folding roller-mounted chair transverse to the strut for fixing the seat surface and which is adjustable to increase the seat depth.

2.) Description of the Related Art

U.S. Pat. No. 4,989,890 disclosed that two struts are changed in length to change the seat width, that is, to widen the frame of the roller-mounted chair, by telescopically adjusting the struts on each side. The '890 design, however, limits the maximum length adjustment. Moreover, the large number of components renders the design somewhat unstable and is comparatively expensive to produce because of the large number of structural elements and assembly connections.

To increase the seat depth, in this previously known design, each seat profile is provided with a front extension piece, which can be fitted onto the tubular seat profile if necessary. This solution appears to be disadvantageous because if an increased seat depth is required, then, not only must the extension pieces be utilized, but a longer seat cover must be used which must be specially refitted for the seat user.

SUMMARY OF THE INVENTION

One object of the invention is to overcome the disadvantages of the known art.

Another object of the invention is to provide a cross-strut arrangement for a folding, roller-mounted chair so that the chair may be adjusted as the user grows.

A further object of the invention is to provide an adjustable cross-strut arrangement that is designed with as few parts as possible and in a cost effective manner.

Yet a further object of the invention is to provide a cross-strut arrangement for a folding, roller-mounted chair that allows the arms of the chair to remain parallel although the length, height and/or width of the chair has been changed.

The invention comprises at least two struts arranged in a crosswise manner, each strut having a top strut section and a bottom strut section, the bottom strut section being connected to the top strut section in a telescopic manner, wherein said top strut section has a row of holes corresponding to a row of holes in said bottom strut section; and a fastener, said fastener fitted through a bore of one row of holes and through a bore in each of said remaining rows of holes, said fastener being located at a center of a crossover point of said at least two struts.

The bottom strut section may be guided in the top strut section such that it can be displaced telescopically. The top and bottom strut sections may also each be of a tubular design. A tube plug may be inserted in the top portion of the tubular bottom strut section to insure a tight fit between the top and bottom strut sections. Moreover, a cross-strut link plate may be mounted at the top portion of the strut section. Optionally, a telescope clamp may be used to securely clamp the top and bottom strut sections. The bottom strut section may optionally be provided with a bottom extension piece.

The objects of the invention are also satisfied by providing for a folding, roller-mounted chair comprising at least two struts arranged in a crosswise manner, each strut having a top strut section and a bottom strut section, the bottom strut section being connected to the top strut section in a telescopic manner, wherein said top strut section has a row of holes corresponding to a row of holes in said bottom strut section and wherein a top end of each top strut section has a seat profile, each seat profile having a front seat profile section and a rear seat profile section connected in a telescopic manner; a fastener, said fastener fitted through a bore of one row of holes and through a bore in each of said remaining rows of holes, said fastener being located at a center of a crossover point of said at least two struts; and a front seat cover fastened to said front seat profile sections and a plurality of main seat tubes.

That folding, roller-mounted chair may further include a rear seat covering securely fastened over the plurality of main seat tubes.

Further objects, features, and advantages of the present invention will be readily apparent from consideration of the detailed description of the preferred embodiment.

BRIEF DESCRIPTION OF THE DRAWINGS

An exemplary embodiment of the invention is illustrated in the drawing, in which.

DETAILED DESCRIPTION OF THE PREFERRED EMBODIMENTS

The following features are included in the present invention:

a) each strut is made up of a top strut section and a bottom strut section, of which one telescopes in the other in a stepwise manner;

b) the two strut sections of a strut each have a row of holes corresponding to a row of holes of the other;

c) the fastener, a screw or the like, forms the cross-strut articulation and is fitted, depending on the seat user's needs, through a bore of one row of holes and, at the same time, through three further bores which are in alignment with said bore and belong to the other three rows of holes of the two struts; and d) the rows of holes are arranged such that the cross-strut articulation can always be fitted in the center of the crossover point.

According to the invention, the two struts can thus be telescoped on just one side. This increases the maximum possible length adjustment of the struts, but decreases the number of necessary components.

A more stable design which is more straightforward to assemble and cost-effective design is achieved. In this case, the top strut section and the bottom strut section may each be formed by a single-piece T-element.

Since children and young people grow, it is desirable, to reduce replacement costs, for their folding roller-mounted chair to "grow" along with them. It is highly desirable if the chair's seat depth is adjustable in addition to its length. The invention thus provides a two-part seat profile design, the front seat-profile section preferably telescoping in the main seat tube in a stepless manner.

At this point, it is advantageous if a front seat covering is fastened on the two front seat-profile sections, which can be displaced along with said sections, and if a stationary, rear seat covering, is fastened on the two main seat tubes, located over part of it.

The two-part seat covering permits straightforward length adjustment. For setting the seat depth, the rear seat covering remains stationary, while the front seat covering is displaced together with the front seat-profile sections.

Figure 1:
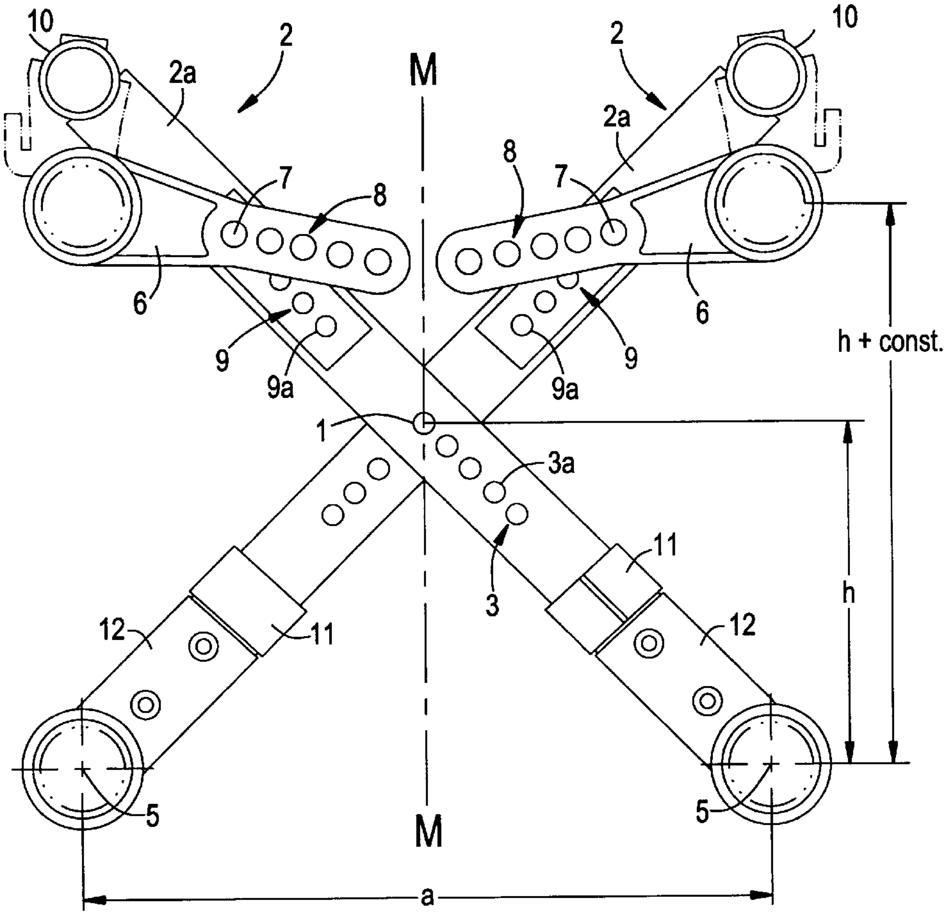
FIG. 1 shows a front view of a cross-strut arrangement set to the minimum seat width.

FIG. 1 shows a cross-strut arrangement for a folding roller-mounted chair (not illustrated specifically). This cross-strut arrangement is illustrated in front view, that is to say it is located transverse to the longitudinal axis of the folding roller-mounted chair. The cross-strut arrangement essentially comprises two struts 2 connected to one another in a crosswise manner via a cross-strut articulation 1.

Figure 2:
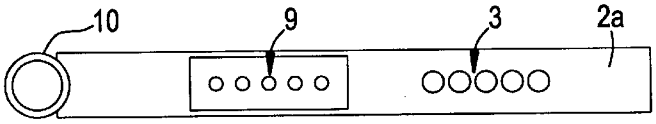
FIG. 2 shows a top strut section of the struts which form the cross-strut arrangement according to FIG. 1.

Each strut 2 is made up of a top, tubular strut section 2*a* (see FIG. 2) and a bottom strut section 2*b* that is also of a tubular design and is guided in the top strut section 2*a* so that it can be displaced telescopically in a stepwise manner. Each strut section 2*a*, 2*b* has a row of holes 3, 4 rows corresponding to one another. A fastener, a screw or the like, forms the cross-strut articulation 1. The fastener is fitted through a bore 3*a* of the row of holes 3 of the top strut section 2*a* and through three bores that are in alignment with said bore 3*a*, the three bores being bore 4*a* of the row of bores 4 of the associated bottom strut section 2*b* as well as 3*a*, 4*a* of the second strut 2. In this case, the rows of holes 3, 4 are arranged such that the cross-strut articulation 1 can always be located in the center of the crossover point, that is, in the vertical longitudinal center plane M and at the height h with respect to the bottom pivot points 5 of the two struts 2. This ensures that the side frames of the folding roller-mounted chair are always located parallel to one another even when the seat width is adjusted.

A cross-strut link plate 6 is attached on each top strut section 2*a* via a connection 7 that is guided through a number of bores 8 in the cross-strut link plate 6 and a bore 9*a* of a mounting-forming row of holes 9 on the top strut section 2*a*. The bores 9*a* are not lead through the top strut section 2*a*, so that the bottom strut section may be inserted into the top strut section at a maximum amount. In one preferred embodiment, a U-profile is welded, by way of its U-legs, onto the top strut section. The bores 9*a* of the row of holes 9 are provided in the U-leg, while a flat steel bar having a row of threaded bores corresponding to the row of holes 9 is pushed into the channel formed between the U-profile and the strut section.

FIG. 1 shows the cross-strut arrangement when it is arranged for a minimum seat width. The two struts 2 are shortened to the minimum length; the cross-strut articulation 1 is fitted through the uppermost bore 3*a* of the top strut section 2*a* and, thus, through the lowermost bore 4*a* of the associated bottom strut section 2*b*; the connection 7 is fitted through the uppermost bores belonging to the number of bores 8 in the cross-strut link plate 6 and to the row of holes 9 of the top strut section 2*a*. The seat width is the distance a between the two top ends of the struts 2, the seat width being defined by one seat profile 10 located in the longitudinal direction of the folding roller-mounted chair transverse to the strut 2. In a practical exemplary embodiment, the minimum seat width is, for example, 23 cm and the maximum seat width, illustrated in FIG. 5, is, for example, 33.5 cm.

Figure 5:
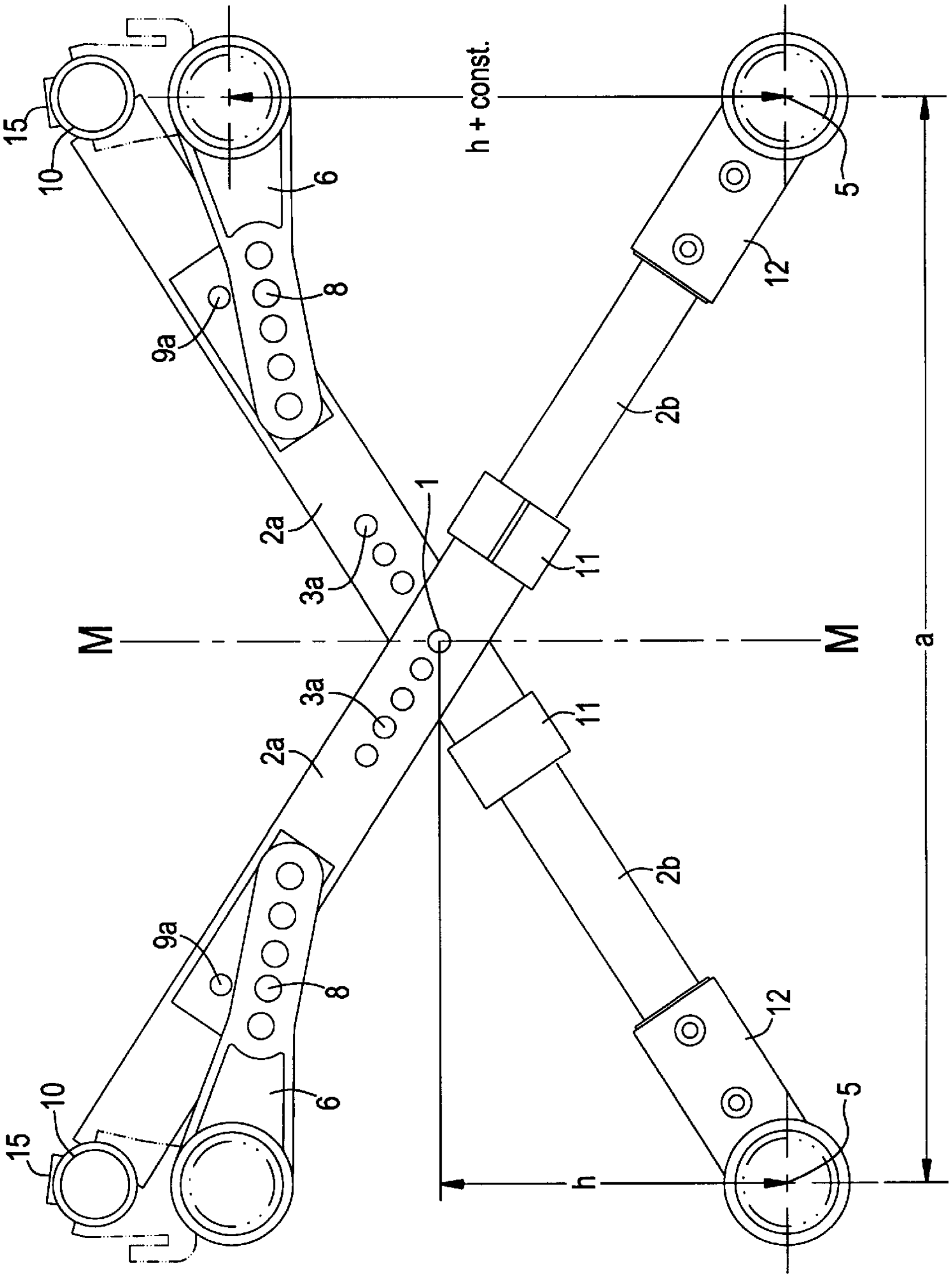
FIG. 5 shows the cross-strut arrangement according to FIG. 1 in the maximum seat-width setting.
Figure 6:
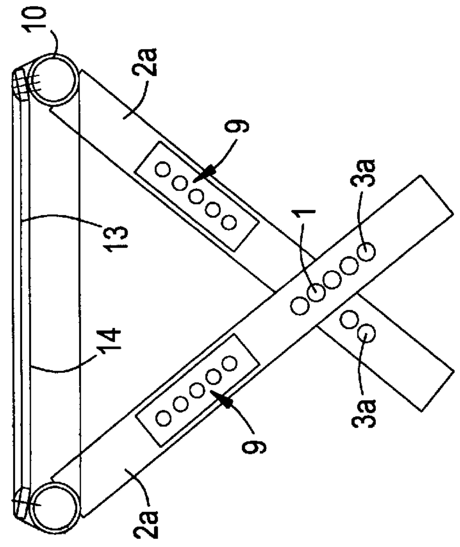
FIG. 6 shows, on a scale which is smaller than that in FIG. 1, a top part of the cross-strut arrangement with the seat surface fitted.
Figure 7:
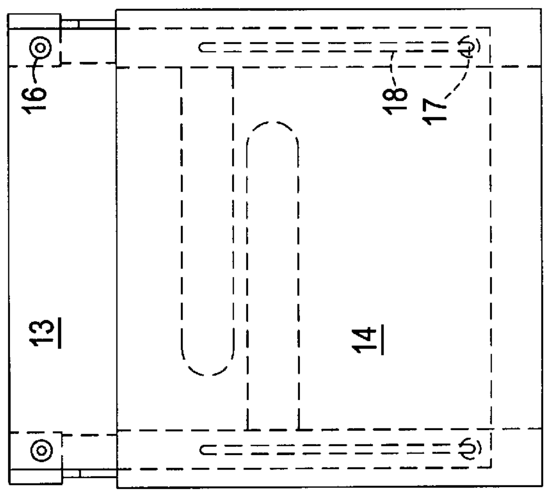
FIG. 7 shows the illustration according to FIG. 6 in plan view.
Figure 8:
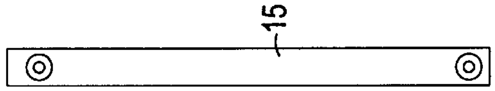
FIG. 8 shows a plan view of a clamping strip indicated by dashed lines in FIG. 7.
Figure 9:
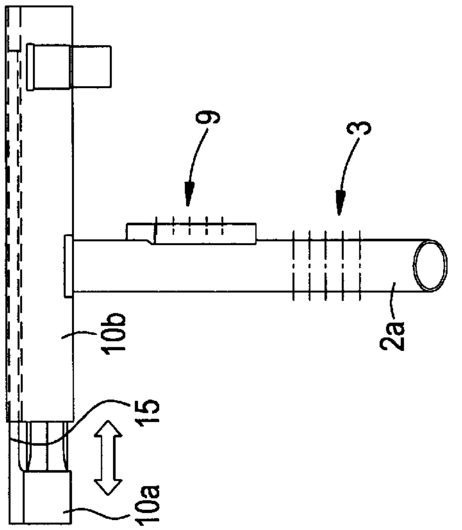
FIG. 9 shows the illustration according to FIG. 6 in side view.

In a cross-strut arrangement defining a maximum seat width, as seen in FIG. 5, the height h of the cross-strut articulation 1 remains unchanged with respect to that in FIG. 1; the cross-strut articulation 1 is also still located on the vertical longitudinal center plane M. Unlike FIG. 1, however, the cross-strut articulation 1 and the connections 7 are each located in the bottom position of the associated rows of holes 3, 4, 8, 9. Each of these rows of holes has a plurality of bores, therefore, intermediate positions are possible.

Figure 3:
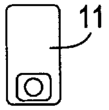
FIG. 3 shows a telescope clamp.
Figure 4:
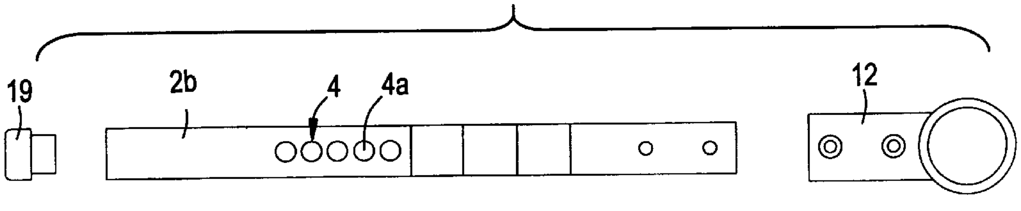
FIG. 4 shows an exploded illustration of a bottom strut section with a tube plug which closes off its top end and with a bottom extension piece.

As seen in FIGS. 1 and 5, the bottom end of each top strut section 2*a* and the adjoining region of the bottom strut section 2*b* are simultaneously enclosed and clamped in a play-free manner by a telescopic clamp 11 (see also FIG. 3). These figures also show, in conjunction with FIG. 4, that the bottom end of the bottom strut section 2*b* is formed by a bottom extension piece 12 that is pushed on or screwed to the bottom strut section 2*b* and is of T-shaped design. Fitted on the top end of the bottom strut section 2*b* is a tube plug 19 that is dimensioned so as to ensure a low-play guidance of the top end of the bottom strut section 2*b* in the top strut section 2*a*.

In addition to a seat-width adjustment, the illustrated cross-strut arrangement also permits a seat-depth adjustment. This is described hereafter with reference to FIGS. 6 to 9.

The seat profile 10 is a two-part design, the front seat-profile section 10*a* telescoping in the main seat tube 10*b* in a stepless manner. Fastened on the two front seat-profile sections 10*a* is a front seat covering 13, which can be displaced together with said sections and has a stationary, rear seat covering 14, fastened on the two main seat tubes 10*b*, located over part of it.

Provided for fixing the front seat covering 13 are two clamping strips 15, each of which is located above the respective seat profile and presses the front seat covering 13 onto the front seat-profile sections 10*a* and onto the two main seat tubes 10*b*. Each clamping strip 15 is fastened via two screw-connections 16, 17, the rear one being guided in a slot 18 in the top side of the main seat tube 10*b* thus permitting a stepless telescopic adjustment and, at the same time, safeguarding from inadvertent pull-outs.

The front seat covering's width is adjustable in a manner similar to that of the rear seat covering (e.g., by means of touch-and-close-fastening strips, clasps or the like (not illustrated)) and can thus be adapted to the desired frame width set by the cross-strut arrangement. The two-part design of the seat covering, means that the latter can easily be adjusted in length as well. The front seat covering 13 is positioned around the clamping strips 15, while the rear seat covering 14 is lead around the main seat tubes 10*b*. For the seat-depth setting, the rear seat covering 14 remains stationary while the front seat covering 13 is displaced together with the front seat-profile sections 10*a*.

Other embodiments of the invention will be apparent to those skilled in the art from consideration of the specification and practice of the invention disclosed herein. It is intended that the specification be considered as exemplary only, with the true scope and spirit of the invention being indicated by the following claims.

Figure 10:
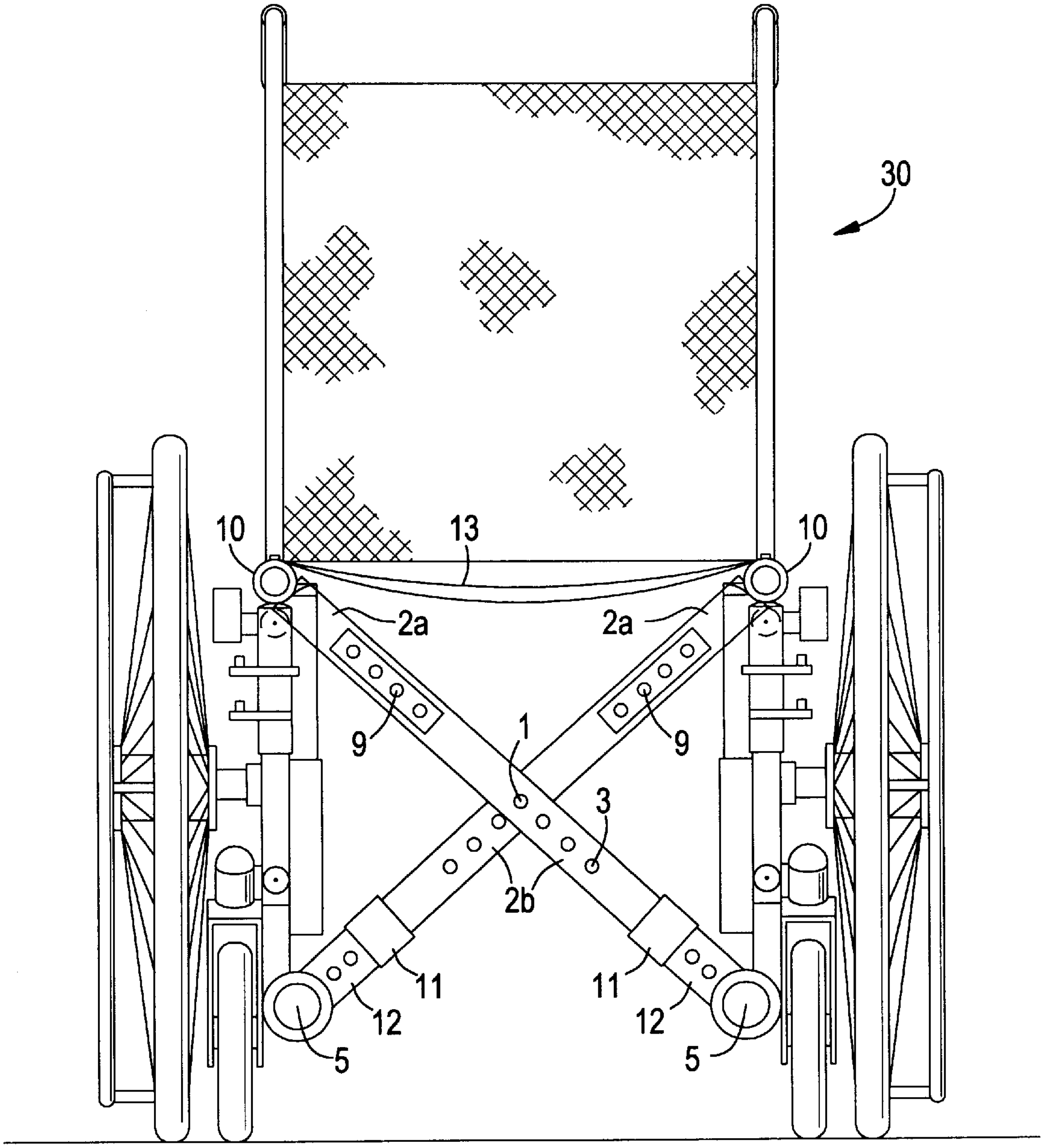
FIG. 10 shows a front view of a roller mounted chair.

Reference is now made to FIG. 10. This figure shows a folding roller-mounted chair 30 having a cross-strut arrangement. As set forth above with reference to FIG. 1, the cross-strut arrangement includes two struts 2 connected to one another in a crosswise manner via a cross-strut articulation 1. Each strut 2 is made up of a top, tubular strut section 2*a* and a bottom strut section 2*b* that is also of a tubular design and is guided in the top strut section 2*a* so that it can be displaced telescopically in a stepwise manner. Each strut section 2*a,* 2*b* has a row of holes 3, 4 rows corresponding to one another. A fastener, a screw or the like, forms the cross-strut articulation 1. The fastener is fitted through a bore hole in one of a row of holes 3 of the top strut section 2*a* and through three bores that are in alignment with the The strut 2 is connected to the chair 30 by seat profiles 10 and bottom pivot points 5. Fastened on the two front seat-profile sections 10 is a front seat covering 13, which is described in more detail with respect to FIG. 6.

Priority application German 19742267.5 filed Sep. 5, 1997, including the specification, claims and abstract, is hereby incorporated by reference.

What is claimed is:

1. A cross-strut arrangement for a folding, roller-mounted chair comprising:

at least two struts arranged in a crosswise manner, each strut having a top strut section and a bottom strut section, the bottom strut section being connected to the top strut section in a telescopic manner, wherein said top strut section has a row of holes corresponding to a row of holes in said bottom strut section; and a fastener, said fastener fitted through a bore of one of said row of holes and through a bore in each of said three remaining rows of holes, said fastener being located at a center of a crossover point of said at least two struts.

2. A cross-strut arrangement for a folding, roller-mounted chair according to claim 1, wherein said bottom strut section is guided in said top strut section such that it can be displaced telescopically.

3. A cross-strut arrangement for a folding-roller mounted chair according to claim 2, wherein said top strut section is tubular.

4. A cross-strut arrangement for a folding, roller-mounted chair according to claim 3, wherein said bottom strut section is tubular.

5. A cross-strut arrangement for a folding, roller-mounted chair according to claim 4, further comprising a tube plug fixedly connected in an end of said bottom strut section located within said top strut section.

6. A cross-strut arrangement for a folding, roller-mounted chair according to claim 1, further comprising a cross-strut link plate mounted on said top strut section of each of said at least two struts.

7. A cross-strut arrangement for a folding, roller-mounted chair according to claim 6, wherein a second row of holes is provided on said top strut section of each of said at least two struts for mounting said cross-strut link plate thereto.

8. A cross-strut arrangement for a folding, roller-mounted chair according to claim 7, wherein said cross-strut link plate has at least one bore for mounting to said to strut section of each of said at least two struts.

9. A cross-strut arrangement for a folding, roller-mounted chair according to claim 1, wherein said top strut section and said bottom strut section of each of said at least two struts is clamped by a telescopic clamp.

10. A cross-strut arrangement for a folding, roller-mounted chair according to claim 1, wherein a bottom extension piece is fastened to a bottom end of each said bottom strut section.

11. A cross-strut arrangement for a folding, roller-mounted chair according to claim 10, wherein said bottom extension piece is screwed to said bottom end of each said bottom strut section.

12. A cross-strut arrangement for a folding, roller-mounted chair according to claim 11, wherein said bottom extension-piece is of a T-shaped design.

13. A cross-strut arrangement for a folding, roller-mounted chair according to claim 1, wherein a top end of each top strut section of each of said at least two struts has a seat profile.

14. A folding, roller-mounted chair comprising:

at least two struts arranged in a crosswise manner, each strut having a top strut section and a bottom strut section, the bottom strut section being connected to the top strut section in a telescopic manner, wherein said top strut section has a row of holes corresponding to a row of holes in said bottom strut section and wherein a top end of each top strut section has a seat profile, each seat profile having a front seat profile section and a rear seat profile section connected in a telescopic manner;

a fastener, said fastener fitted through a bore of one of said row of holes and through a bore in each of said three remaining rows of holes, said fastener being located at a center of a crossover point of said at least two struts; and a front seat cover fastened to said front seat profile sections and a plurality of main seat tubes.

15. A folding, roller-mounted chair according to claim 14 further comprising a rear seat covering securely fastened over said main seat tubes.

16. A folding, roller-mounted chair according to claim 15, further comprising means for fastening a clamping strip to each of said front seat profile sections and said main seat tubes.

17. A folding, roller-mounted chair according to claim 14, wherein said plurality of clamping strips are fastened to said front profile sections and to said main seat tubes by two screw connections.

18. A folding, roller-mounted chair according to claim 14 further comprising a plurality of clamping strips for fastening said front seat cover to the front-seat profile sections.

* * * * *